(12) United States Patent
Lee

(10) Patent No.: US 12,317,784 B2
(45) Date of Patent: Jun. 3, 2025

(54) BLOWING-SUCKING DEVICE

(71) Applicant: TECHTRONIC CORDLESS GP, Anderson, SC (US)

(72) Inventor: Wai Chung Lee, Kwai Chung (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 547 days.

(21) Appl. No.: 17/719,795

(22) Filed: Apr. 13, 2022

(65) Prior Publication Data
US 2022/0330495 A1 Oct. 20, 2022

(30) Foreign Application Priority Data
Apr. 14, 2021 (CN) .......................... 202110403067.X

(51) Int. Cl.
*A01G 20/47* (2018.01)
*A47L 5/14* (2006.01)

(52) U.S. Cl.
CPC ................ *A01G 20/47* (2018.02); *A47L 5/14* (2013.01)

(58) Field of Classification Search
CPC ......... A01G 20/47; A47L 5/14; E01H 1/0863; E01H 1/0809; E01H 1/0836
See application file for complete search history.

(56) References Cited

U.S. PATENT DOCUMENTS

| 4,290,165 A | 9/1981 | Hiramatsu |
| 2002/0166197 A1 | 11/2002 | Jong |
| 2008/0307602 A1 | 12/2008 | Andriolo |

FOREIGN PATENT DOCUMENTS

| CN | 107419684 A | 12/2017 |
| GB | 2298781 A | 9/1996 |
| WO | WO2014175789 A1 | 10/2014 |

OTHER PUBLICATIONS

CN107419684 A; An et al. Dec. 2017; machine translation (Year: 2017).*
European Search Report Corresponding with Application No. EP21216229 on Jun. 9, 2022 (1 page).

* cited by examiner

*Primary Examiner* — David Redding
(74) *Attorney, Agent, or Firm* — Dority & Manning, P.A.

(57) ABSTRACT

The present invention discloses a blowing-sucking device. The blowing-sucking device comprises a fan and defines a blowing path and a sucking path, and comprises a first housing, a second housing, and at least one air duct, wherein the second housing is provided between the first housing and the at least one air duct, and defines at least part of the blowing path and/or the sucking path, and the second housing is configured to be detachably connected to both the first housing and the at least one air duct. The blowing-sucking device according to one or more embodiments of the present invention is compact in structure and easy to disassemble and assemble. It is easy to inspect, clean, and replace its internal components. The device features operational suitability, flexibility, and convenience.

20 Claims, 6 Drawing Sheets

BLOWING-SUCKING DEVICE

This application claims the benefit of priority to Chinese Application No. CN 202110403067X, filed on Apr. 14, 2021, the disclosure of which is incorporated by reference herein in its entirety.

TECHNICAL FIELD

The present invention relates to the field of power tools, and in particular to a blowing-sucking device.

BACKGROUND ART

Blowing-sucking devices are a common cleaning appliance, used for, for example, cleaning and collecting fallen leaves outdoors (for example, in gardens).

Existing blowing-sucking devices have many shortcomings, for example, the structure is not compact enough, the operation, component repair and replacement are not convenient and flexible, the user experience is not ideal, and they can only work in a single mode or the position of the air duct needs to be adjusted for mode switching when they work in multiple modes, etc.

SUMMARY OF THE INVENTION

Targeting one or more technical disadvantages in the prior art, the present invention provides a blowing-sucking device.

According to one aspect of the present invention, a blowing-sucking device is provided. The blowing-sucking device comprises a fan and defines a blowing path and a sucking path, and comprises a first housing, a second housing, and at least one air duct, wherein the second housing is provided between the first housing and the at least one air duct, and defines at least part of the blowing path and/or the sucking path, more preferably defines the part of the blowing path and/or sucking path near the fan, and the second housing is configured to be detachably connected to both the first housing and the at least one air duct.

Optionally or additionally, the at least one air duct comprises a suction pipe and a blowing pipe, and the second housing comprises a first air port, a second air port, and a third air port, wherein the suction pipe is connected to the second housing through the first air port, the blowing pipe is connected to the second housing through the second air port, and the third air port is configured to be operatively connected to a collecting device.

Optionally or additionally, the blowing-sucking device is configured as such that, in a first mode, airflow enters the suction pipe and enters the collecting device through the first air port and the third air port, and, in a second mode, airflow enters the suction pipe and leaves the blowing pipe through the first air port and the second air port.

Optionally or additionally, the first housing defines a first axis, the second housing defines a second axis, and the at least one air duct defines a third axis, wherein the first axis and the second axis are parallel or form an acute angle, and preferably, the first axis and the second axis form a first angle, the second axis and the third axis form a second angle, and the first angle is smaller than the second angle.

Optionally or additionally, the second housing is further provided with a mounting mechanism, which comprises a fixing part for fixing the collecting device, and preferably the mounting mechanism further comprises a supporting part that extends outward.

Optionally or additionally, the blowing-sucking device further comprises a travelling mechanism configured to at least partially support the at least one air duct, and preferably the travelling mechanism and the supporting part together support the blowing-sucking device.

Optionally or additionally, the blowing pipe is provided below the suction pipe, and preferably the blowing pipe comprises a suspension mechanism configured to at least partially bear the weight of the collecting device.

Optionally or additionally, the first housing is provided with a first holding mechanism, the second housing is provided with a second holding mechanism, preferably the first holding mechanism and the second holding mechanism extend essentially in the same direction, and more preferably the first holding mechanism and the second holding mechanism form a continuous contour.

Optionally or additionally, the first housing is provided with a switching mechanism for controlling the blowing-sucking device and a triggering mechanism for triggering the switching mechanism, preferably the switching mechanism comprises a speed regulating mechanism for adjusting the operating speed of a power device, and preferably the triggering mechanism comprises a membrane button.

According to another aspect of the present invention, a blowing-sucking device is provided. The blowing-sucking device comprises a first housing and at least one air duct, a power device is provided in the first housing, and a fan is connected to the power device, wherein the fan is at least partially located outside the first housing, and the first housing is configured to be detachably mounted on the blowing-sucking device to selectively expose the fan.

Optionally or additionally, the blowing-sucking device further comprises a second housing provided between the first housing and the at least one air duct, the first housing is configured to be detachably mounted on the second housing, and the fan is located in the second housing.

Optionally or additionally, the second housing is configured to be detachably connected to both the first housing and the at least one air duct.

Optionally or additionally, the at least one air duct comprises a suction pipe and a blowing pipe, and the second housing comprises a first air port, a second air port, and a third air port, wherein the suction pipe is connected to the second housing through the first air port, the blowing pipe is connected to the second housing through the second air port, and the third air port is configured to be operatively connected to a collecting device.

Optionally or additionally, the blowing-sucking device is configured as such that, in a first mode, airflow enters the suction pipe and enters the collecting device through the first air port and the third air port, and, in a second mode, airflow enters the suction pipe and leaves the blowing pipe through the first air port and the second air port.

Optionally or additionally, the first housing defines a first axis, the second housing defines a second axis, and the at least one air duct defines a third axis, wherein the first axis and the second axis are parallel or form an acute angle, and preferably, the first axis and the second axis form a first angle, the second axis and the third axis form a second angle, and the first angle is smaller than the second angle.

Optionally or additionally, the second housing is further provided with a mounting mechanism, which comprises a fixing part for fixing the collecting device, and preferably the mounting mechanism further comprises a supporting part that extends outward.

Optionally or additionally, the blowing-sucking device further comprises a travelling mechanism configured to at least partially support the at least one air duct, and preferably the travelling mechanism and the supporting part together support the blowing-sucking device.

Optionally or additionally, the blowing pipe is provided below the suction pipe, and preferably the blowing pipe comprises a suspension mechanism configured to at least partially bear the weight of the collecting device.

Optionally or additionally, the first housing is provided with a first holding mechanism, the second housing is provided with a second holding mechanism, preferably the first holding mechanism and the second holding mechanism extend essentially in the same direction, and more preferably the first holding mechanism and the second holding mechanism form a continuous contour.

Optionally or additionally, the first housing is provided with a switching mechanism for controlling the blowing-sucking device and a triggering mechanism for triggering the switching mechanism, preferably the switching mechanism comprises a speed regulating mechanism for adjusting the operating speed of a power device, and preferably the triggering mechanism comprises a membrane button.

The blowing-sucking device according to one or more embodiments of the present invention has several advantages. For example, the blowing-sucking device according to one or more embodiments of the present invention is compact in structure, easy to disassemble and assemble, easy to inspect, clean, and replace one or more internal components, etc. For another example, the blowing-sucking device according to one or more embodiments of the present invention can work in different modes, it is easy to switch between different modes, and applicability of the device is wider. For yet another example, the blowing-sucking device according to one or more embodiments of the present invention saves labour and is ergonomic, making it suitable for users in a wider range of physical strength.

More embodiments and beneficial technical effects of the present invention will be described in detail below.

DETAILED DESCRIPTION OF THE EMBODIMENTS

In order to facilitate the understanding of the present invention, a number of exemplary embodiments will be described below with reference to related drawings.

Figure 1A:
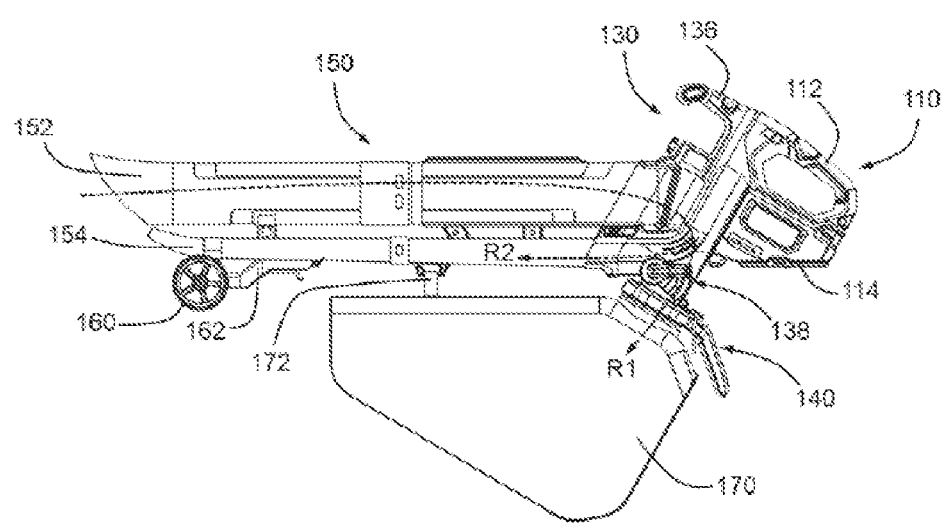
FIG. 1A is a schematic structural diagram of the blowing-sucking device according to some embodiments of the present invention.
Figure 1B:
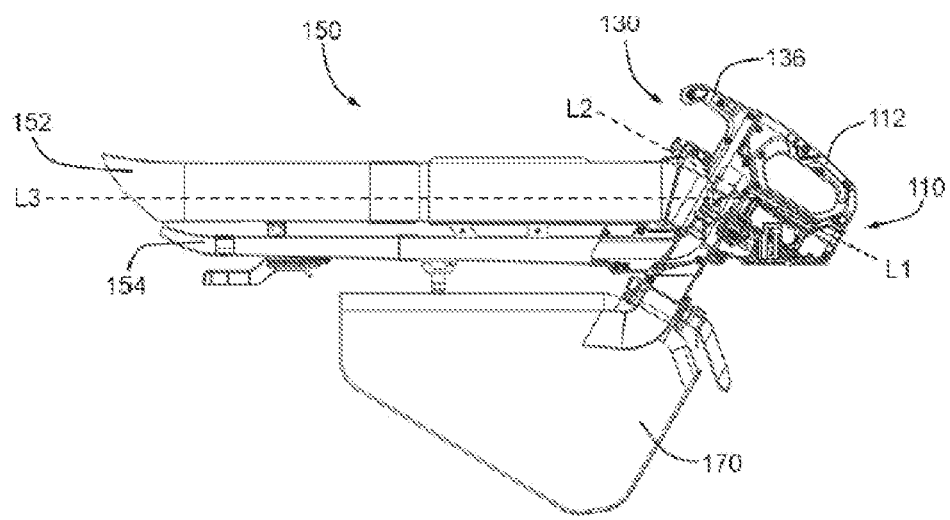
FIG. 1B is a schematic profile view of the blowing-sucking device shown in FIG. 1A.
Figure 1C:
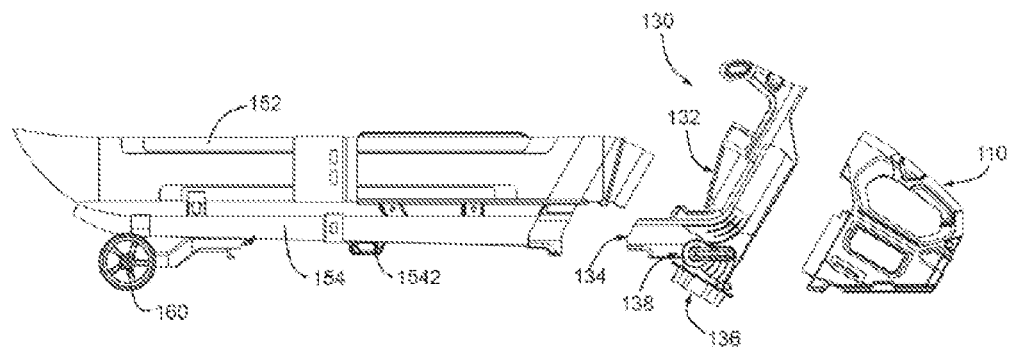
FIG. 1C is a schematic diagram of the blowing-sucking device shown in FIG. 1A with some structures detached.

According to one aspect of the present invention, FIGS. 1A to 1C are schematic structural diagrams of the blowing-sucking device according to some embodiments of the present invention. Blowing-sucking devices can be used for cleaning and collecting fallen leaves outdoors (for example, in gardens) and for other suitable purposes or in other places.

As illustrated, the blowing-sucking device defines a blowing path (for example, in a blowing mode) and a suction path (for example, in a sucking mode). For convenience, the blowing path and the suction path are also collectively referred to as the flow paths hereinafter. The blowing-sucking device comprises a first housing 110, a second housing 130, and at least one air duct 150. The second housing 130 is provided between the first housing 110 and the at least one air duct 150, and defines at least part of the blowing path and/or the suction path. The second housing 130 is configured to be detachably connected to both the first housing 110 and the at least one air duct 150 (FIG. 1C).

The first housing 110 and the second housing 130 may be made of suitable materials, for example, plastics, metals, metal alloys, or a combination thereof. The first housing 110 may be integrally formed, or may comprise two or more sub-housings constructed in a suitable manner (for example, by splicing). The second housing 130 may be integrally formed, or may comprise two or more sub-housings constructed in a suitable manner (for example, by splicing). In some embodiments, the first housing 110 is formed by two sub-housings, i.e., a left and a right sub-housing, and the second housing 130 is formed by two sub-housings, i.e., a left and a right sub-housing. The at least one air duct 150 may be formed in an appropriate manner, for example, it may have a hollow structure or define one or more hollow parts. The hollow structure or hollow parts can define at least part of the blowing path and/or the suction path.

Existing blowing-sucking devices (for example, hair dryers or blowers) usually comprise a single housing for the main body, and the corresponding mechanical components and/or electronic circuits are arranged in the housing for the main body. When it is necessary to repair, clean, or replace these components or circuits, the housing for the main body has to be opened. For example, when a blockage occurs during operation, the user can only remove the blockage by opening the housing for the main body. This is usually inconvenient and may cause damage to the housing for the main body or the mechanical components and electronic circuits therein.

The inventor has recognised this problem in the prior art, and has further recognised the difficulty in improving the housing for the main body. For example, improving the housing for the main body usually involves substantial structural improvements, including but not limited to the repositioning of the mechanical components, re-laying of the electronic circuits therein, etc. The inventor has creatively proposed a solution as illustrated, wherein two independent and detachable housings, i.e., the first housing 110 and the second housing 130, are used. The housings 110 and 130 may be coupled in a suitable manner, for example, by snap connection, socket connection, splicing, pivot connection, thread connection, screw connection, etc. Mechanical components and electronic circuits can be arranged according to one or more of the embodiments described below or a suitable combination thereof. In some embodiments, the power device and the control device of the blowing-sucking device of the present invention are essentially or completely installed in the first housing 110, and the second housing 130 only provides mechanical coupling and at least partially defines the blowing path and/or the suction path. This configuration makes electrical configurations very simple. It not only maintains the compactness of the overall mechanism, but also greatly increases the operational flexibility, and facilitates the disassembly and detachment of various parts of the blowing-sucking device. Hence, the user can conveniently check, clean, repair, replace, etc. the blowing-sucking device and one or more components or circuits therein.

As illustrated, the first housing 110 is provided with a first holding mechanism 112, and the second housing 130 is provided with a second holding mechanism 136. The first holding mechanism 112 and the second holding mechanism 136 are, for example, handles, which are convenient for the user to hold by hand when using or transporting the blowing-sucking device. In this particular embodiment, the first holding mechanism 112 and the second holding mechanism 136 extend essentially in the same direction. After the housings 110 and 130 are assembled, the holding mechanisms 112 and 136 form a continuous contour.

This design is ergonomic and will improve user experience, for example, by meeting the preferences or needs of different users. For example, the user may stand behind the blowing-sucking device and hold the first holding mechanism 112 with one hand. The user may also stand beside the blowing-sucking device and hold the first holding mechanism 112 or the second holding mechanism 136 with one hand. The user may also hold the first holding mechanism 112 with one hand and the second holding mechanism 136 with the other hand. Moreover, this design is equally convenient for left-handed and right-handed users.

In addition, this design also provides additional convenience in the actual technical operation process. For example, in different applications (for example, different modes) or when the weight of collected materials (for example, fallen leaves) changes, the centre of gravity of the blowing-sucking device may change. Since the first holding mechanism 112 and the second holding mechanism 136 essentially extend along the direction of the air duct 150, the user can conveniently choose to hold an appropriate position of the first holding mechanism 112 or the second holding mechanism 136 depending on the change in the centre of gravity of the blowing-sucking device, thereby saving labour or improving comfort.

In some embodiments, the first holding mechanism 112 or the second holding mechanism 136 may be designed as other configurations. For example, the first holding mechanism 112 and the second holding mechanism 136 may extend at a certain angle, for example, the right angle or an acute angle. Other forms are also possible.

A power interface 114 is further provided on the rear end of the housing 110. The power interface 114 may be a DC or and AC interface. The power interface 114 can be used, for example, for accommodating one or more battery packs, for example, an 18V battery pack. The power interface 114 can be connected, for example, directly to a power source, for powering the blowing-sucking device. The power interface 114 can be, for example, electrically connected to an AC power grid through one or more adapters. The first housing 110 or the second housing 130 is also provided with a power device (not shown) and an air flow generating device (not shown). The power device is, for example, a motor, for example, a brushless DC motor. The air flow generating device is, for example, a fan, for example, a centrifugal fan. The power device receives power through the power interface 114 and provides power to the air flow generating device.

As illustrated in FIG. 1B, the first housing 110 defines a first axis L1, the second housing 130 defines a second axis L2, and the at least one air duct 150 defines a third axis L3. The first axis L1 is, for example, essentially parallel to the first holding mechanism 112. The second axis L2 is, for example, essentially parallel to the second holding mechanism 136. The third axis L3 is, for example, essentially parallel to the length of the at least one air duct 150. In some embodiments, the first axis L1 and the second axis L2 are both perpendicular to the interface between the first housing 110 and the second housing 130. In this particular embodiment, the first axis L1 and the second axis L2 are essentially parallel (including being collinear). In some embodiments, the first axis L1 and the second axis L2 form an acute angle of, for example, 10°, 20°, 30°, 45°, 60°, or 80°. In some embodiments, it is advantageous that the angle between the first axis L1 and the second axis L2 does not exceed 60°. In some embodiments, it is advantageous that the angle between the first axis L1 and the second axis L2 does not exceed 30°, and it is more advantageous that the angle does not exceed 10°. In addition, in this particular embodiment, as illustrated, the first axis L1 and the second axis L2 form a first angle, the second axis L2 and the third axis L3 form a second angle, and the first angle is smaller than the second angle. The first angle is, for example, 0°, 10°, 20°, etc. The second angle is, for example, 30°, 45°, 60°, etc.

The inventor recognises that the relative positions between the two housings and the air duct have an important influence on the overall structure and the air flow of the blowing-sucking device. A design that satisfies the above specific relationships among the axes can increase the compactness of the blowing-sucking device so that it has a smaller volume. In addition, it is conducive to the flowing of air inside the blowing-sucking device. For example, it can increase airflow utilization efficiency, reduce energy consumption, reduce heat generation, etc. Moreover, it is also advantageous for the coupling between the two housings, the connection of mechanical components therein, and the laying of electronic circuits.

With reference to FIGS. 1A and 1C again, the at least one air duct 150 comprises a suction pipe 152 and a blowing pipe 154. The second housing 130 comprises a first air port 132, a second air port 134, and a third air port 136. The suction pipe 152 is connected to the second housing 130 through the first air port 132, the blowing pipe 154 is connected to the second housing 130 through the second air port 134, and the third air port 136 is configured to be operatively connected to a collecting device 170.

The blowing-sucking device can work in different modes. In a first mode or the suction mode, airflow enters the suction pipe 152 and enters the collecting device 170 through the first air port 132 and the third air port 136 (path R 1 in FIG. 1A). In a second mode or the blowing mode, airflow enters the suction pipe 152 and leaves the blowing pipe 154 through the first air port 132 and the second air port 134 (path R 2 in FIG. 1A).

Hence, the second housing 130 according to some embodiments of the present invention defines at least part of each of the blowing path and the suction path. This design is very beneficial for the removal of blockages. The inventor of the present invention has found that blocking of a blowing-sucking device usually occurs in the upstream or downstream near the blowing-sucking fan. The second housing 130 exactly defines the blowing or suction path in the upstream and downstream near the blowing-sucking fan. Therefore, when blocking occurs, the blockage in the flow paths can be easily removed by simply removing the second housing 130 from the main body. In some embodiments, the second housing 130 may only define an upstream position near the blowing-sucking fan, or only define a downstream position near the blowing-sucking fan, to achieve a similar technical effect. In addition, in some embodiments, since the electronic control circuits of the blowing-sucking device are essentially arranged in the first housing, the process of removing the second housing to remove the blockage will have little impact on the electronic control circuits.

Figure 2A:
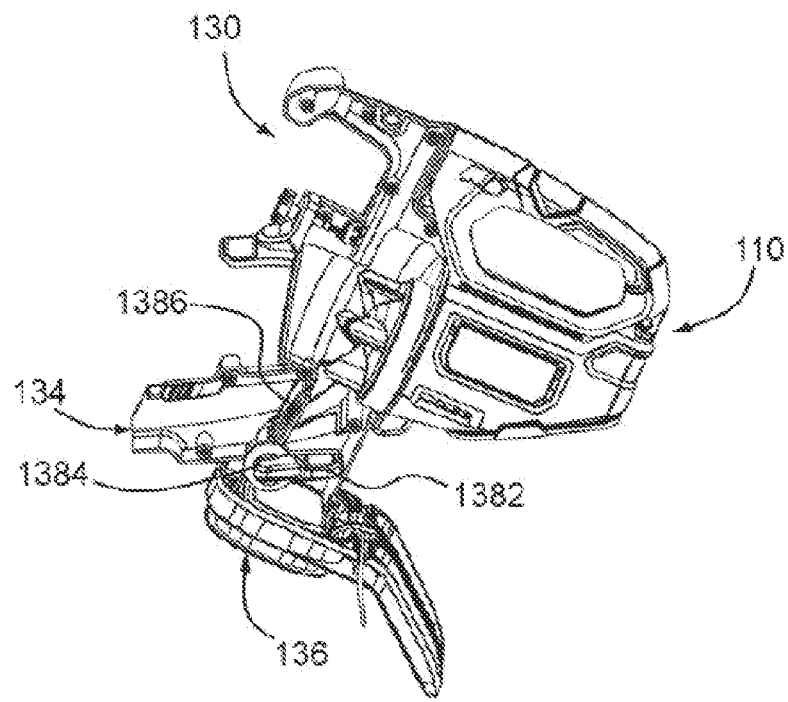
FIG. 2A is a schematic diagram of the blowing-sucking device (with only some structures shown) shown in FIG. 1A in a first mode.
Figure 2B:
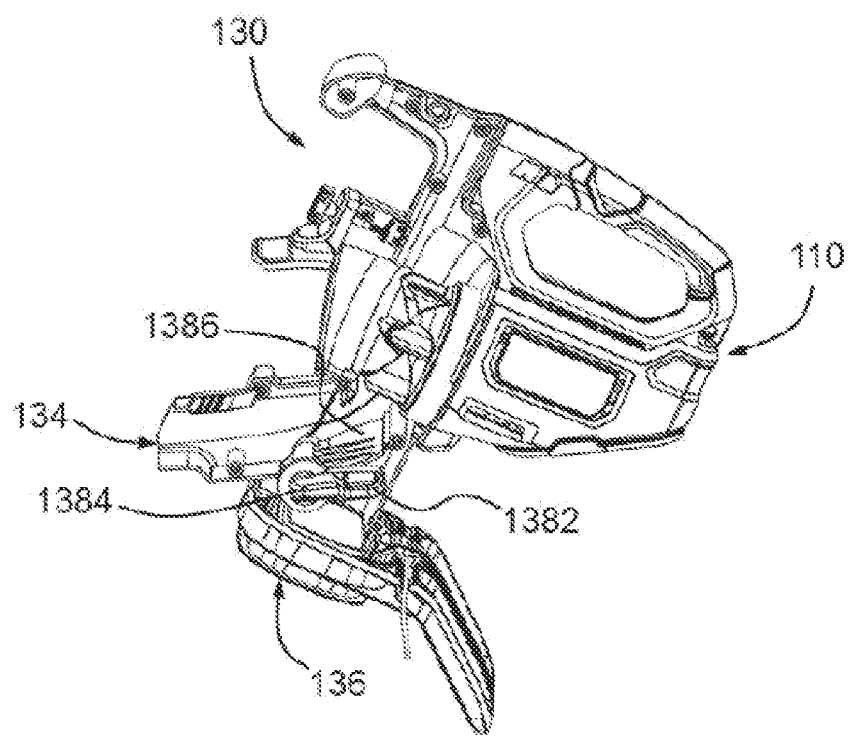
FIG. 2B is a schematic diagram of the blowing-sucking device (with only some structures shown) shown in FIG. 1A in a second mode.

In some embodiments, a mode control mechanism may be used for mode switching. The mode control mechanism can, for example, realize mode control by means of translation, rotation, or a combination thereof. FIGS. 2A and 2B illustrate the mode control mechanism 138. The mode control mechanism 138 comprises a driving part 1382 and a shielding part 1386. The driving part 1382 operatively drives the shielding part 1386 to pivot about an axis 1384. The driving part 1382 is implemented, for example, as a knob, and the shielding part 1386 is implemented, for example, as a baffle. FIG. 2A illustrates a first mode, wherein the shielding part 1386 shields the second air port 134 so that airflow cannot enter the blowing pipe 154, i.e., airflow will enter the collecting device 170 through the third air port 136. FIG. 2B illustrates a second mode, wherein the shielding part 1386 is pivoted to a position where it shields the third air port 136, so that airflow cannot enter the collecting device 170 through the third air port 136, i.e., airflow will enter the blowing pipe 154 through the second air port 134, and will be blown out through the blowing pipe 154.

Optionally, FIGS. 1A to 1C illustrate the collecting device 170. The collecting device 170 comprises, for example, a collecting bag. The collecting device 170 may be part of the blowing-sucking device, or provided as an additional accessory detachably connected to the blowing-sucking device. The collecting device 170 is advantageous as an accessory, as this can increase flexibility, for example, save space during storage or transportation, and facilitate handling, replacement, etc.

Figure 3:
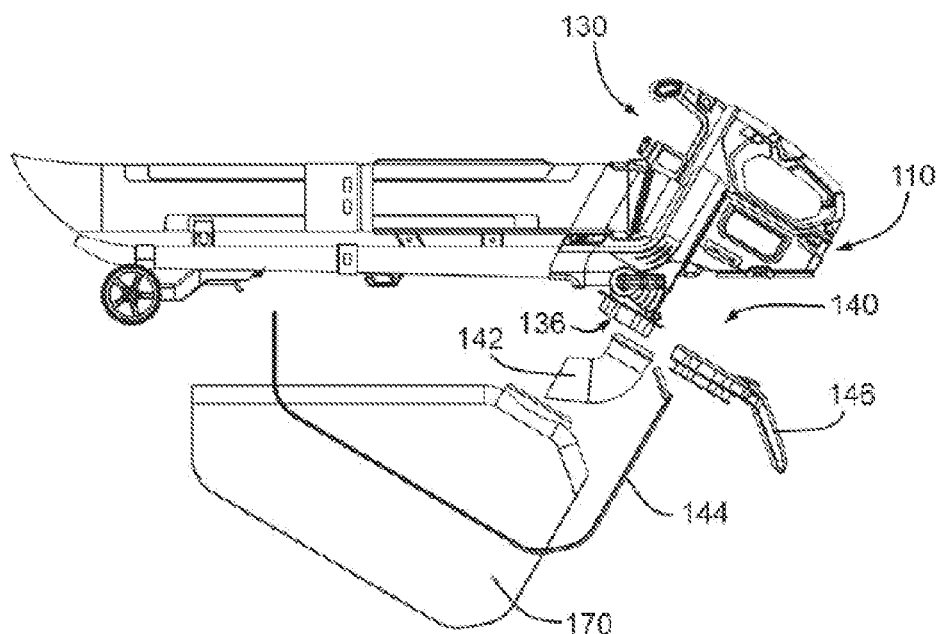
FIG. 3 is a schematic diagram of the collecting device of FIG. 1A in the detached state.

FIG. 3 is a schematic diagram of the collecting device of FIG. 1A in the detached state. As illustrated, the second housing 130 is provided with a mounting mechanism 140. The mounting mechanism 140 comprises a fixing part for fixing the collecting device 170. For example, at least part of the fixing part can be sleeved at the third air port 136. The fixing part comprises, for example, an extending part 142. At least one end of the extending part 142 may be arranged in the circumferential direction to match and couple with the inlet of the collecting device 170, so as to at least partially fix the collecting device 170. In some embodiments, as illustrated, one end of the extending part 142 is joined to the second housing 130 at the third air port 136, and the other end penetrates into the inner space of the collecting device 170 to a certain depth. In some embodiments, as illustrated, the end of the extending part 142 that penetrates into the collecting device 170 has a certain degree of curvature, which is advantageous. For example, it can help to support or shape the inlet portion of the collecting device 170, and it can also help to collect the collected materials (for example, fallen leaves) in the collecting device 170 evenly, preventing the situation where most of the materials scatter near the inlet of the collecting device 170. In some embodiments, the fixing part comprises, for example, a skeleton structure 144, which is advantageous in some aspects. For example, when the collecting device 170 is flexible (for example, when the collecting device is a cloth bag), the skeleton structure 144 may be used as the skeleton of the collecting device 170 to shape the collecting device 170.

In some embodiments, as illustrated, the mounting mechanism 140 further comprises a supporting part 146 that extends outward. The supporting part 146 is used to support the blowing-sucking device when the collecting device 170 is removed, which can, for example, prevent the battery of the blowing-sucking device from contacting the ground. In addition, a handrail is further provided on the supporting part 142. For example, during operation, when airflow produces pressure or the increasing materials in the collecting device 170 produces weight, the handrail on the supporting part 142 will make it easy for the operator to apply force to lift the collecting device 170, and it increases operation safety.

In some embodiments, as shown in FIG. 1A, the blowing-sucking device comprises a travelling mechanism 160. The travelling mechanism 160 is, for example, one or more rollers, which are connected to the blowing pipe 154 through a coupling mechanism 162, and at least partially support the blowing pipe 154 and/or the suction pipe 152. The travelling mechanism 160 can provide support for the blowing-sucking device, and can facilitate movement of the blowing-sucking device. For example, during operation, the user may hold the suitable holding mechanism 112 or 136, and, without the need of applying a lot of force, use the travelling mechanism 160 to move the blowing-sucking device to operate on the desired operation object (for example, fallen leaves or dust).

In some embodiments, when the collecting device 170 is installed, the travelling mechanism 160 and the skeleton structure 144 can support the blowing-sucking device together. When the collecting device 170 is removed, the travelling mechanism 160 and the supporting part 146 support the blowing-sucking device together. During operation of the blowing-sucking device, the travelling mechanism 160 is in contact with a supporting surface (for example, the ground). Therefore, the user can move the blowing-sucking device with only a little effort. This is advantageous for saving the user's effort and reducing the user's fatigue. In addition, such a blowing-sucking device also has wider applicability. For example, it can be used by users of a wider range of physical strength.

In addition, in some embodiments, as illustrated in FIGS. 1A and 1C, the blowing pipe 154 is provided below the suction pipe 152. Those skilled in the art should understand that this is not necessary. For example, in some embodiments, the blowing pipe may be provided above the suction pipe, or the two may be arranged side by side, etc. In some embodiments, as illustrated, the blowing pipe 154 is provided with a suspension mechanism 1542, for example, a hook. Accordingly, a hooking mechanism 172, for example, a strap, is provided on the collecting device 170. The hooking mechanism 172 can suspend the collecting device 170 on the suspension mechanism 1542, so that the suspension mechanism 1542 at least partially bears the weight of the collecting device 170. This is advantageous for further maintaining the stability of the collecting device 172 during operation.

According to another aspect of the present invention, FIGS. 4A to 4D are schematic diagrams of some structures of the blowing-sucking device in different states according to some embodiments of the present invention.

The blowing-sucking device comprises a first housing 410 and at least one air duct 450. A power device (not shown), for example, a motor, is provided in the first housing 410. The power device receives power through a power interface 414. The power device is connected to a fan 416 and operatively provides power to the fan 416. The fan 416 is at least partially located outside the first housing 410. The first housing 410 is configured to be detachably mounted on the blowing-sucking device to selectively expose the fan 416. More particularly, the present invention allows the fan 416 to be completely exposed when the first housing 410 is removed from the blowing-sucking device, so as to facilitate the cleaning of debris entangled on the fan 416. In some embodiments, a control device is also located on the first housing 410. The control device comprises, for example, a control circuit, a control switch, etc.

Figure 4A:
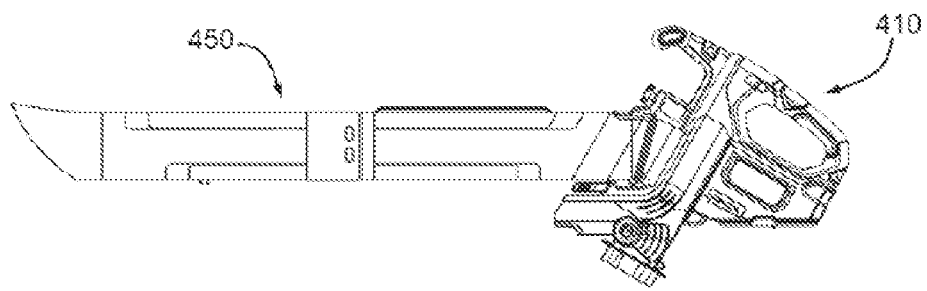
FIG. 4A is a schematic structural diagram of some structures of the blowing-sucking device according to some other embodiments of the present invention.
Figure 4B:
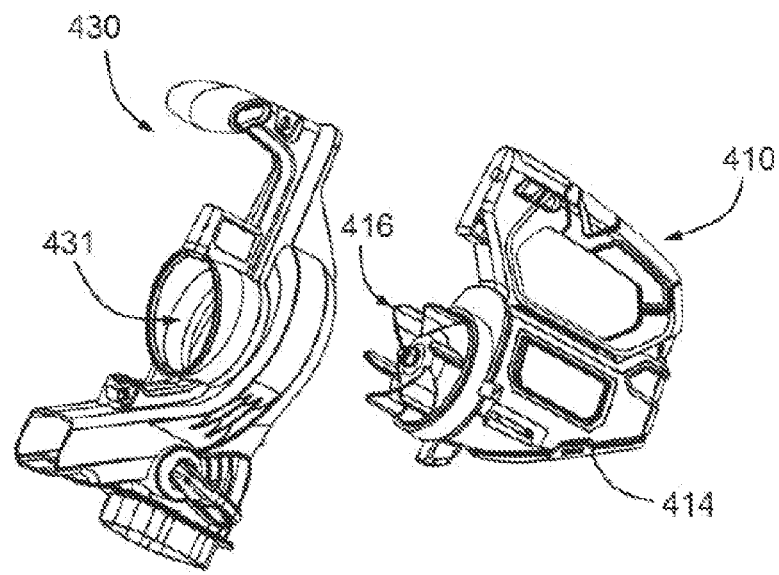
FIG. 4B is a schematic diagram of the first housing and the second housing of the blowing-sucking device shown in FIG. 4A in the detached state.
Figure 4C:
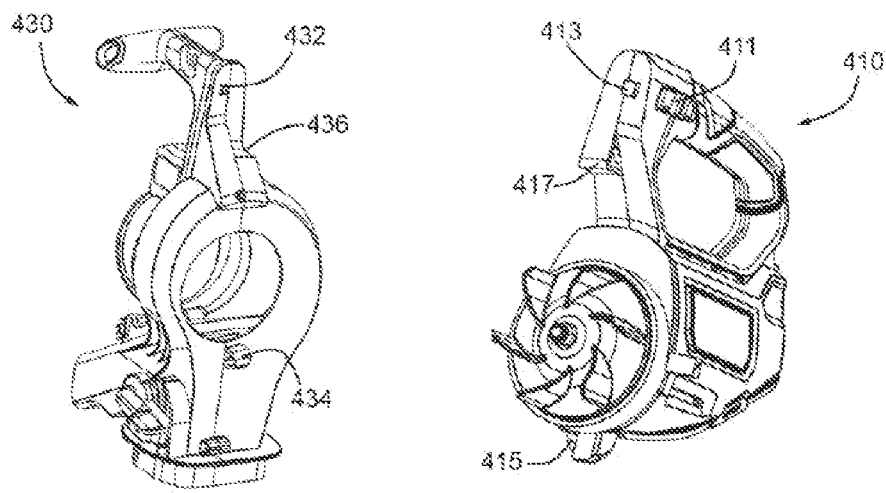
FIG. 4C is a schematic structural diagram of the first housing and the second housing of the blowing-sucking device shown in FIG. 4A.
Figure 4D:
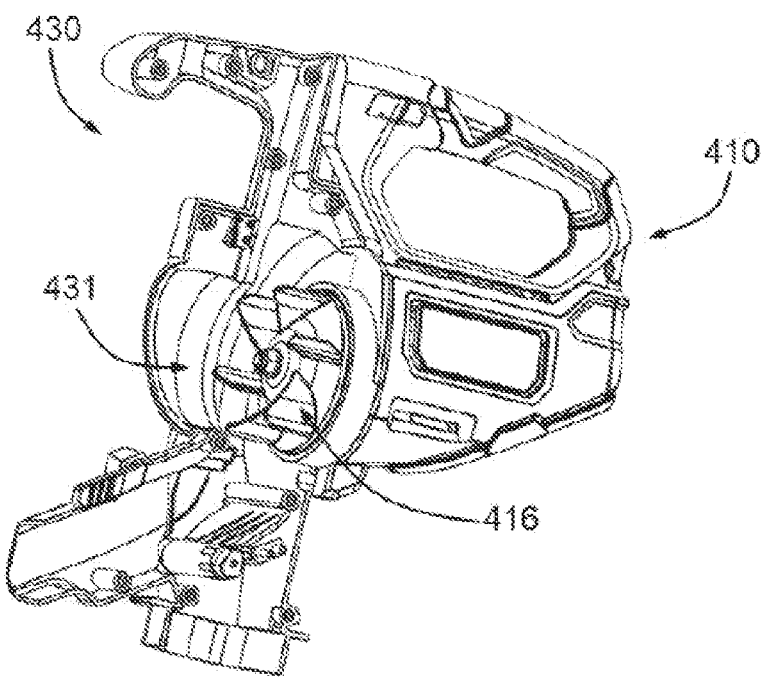
FIG. 4D is a schematic diagram of the first housing and the second housing of the blowing-sucking device shown in FIG. 4A in the assembled state.

In some embodiments, as illustrated in FIGS. 4B to 4D, the blowing-sucking device comprises a second housing 430 provided between the first housing 410 and the at least one air duct 450 (for clarity, the air duct 450 is not shown in FIGS. 4B to 4D). The first housing 410 is configured to be detachably mounted on the second housing 430. In the assembled state, the fan 416 is essentially located in the second housing 430.

For the purpose of clear illustration, FIG. 4B is a schematic diagram of the first housing 410 and the second housing 430 in the detached state. The fan 416 is at least partially exposed from the first housing 410. FIG. 4C shows an example of the components for assembly of the first housing and the second housing. FIG. 4D is a schematic diagram of the first housing 410 and the second housing 430 in the assembled state. For the purpose of clear illustration, a part of the second housing 430 is removed. As illustrated, after assembly, at least part of the fan 416 is located in the inner space 431 of the second housing 430.

In some embodiments, mounting of the first housing 410 and the second housing 430 is implemented in the following exemplary manner. With reference to FIG. 4C, an assembly switch 411 is provided near the holding mechanism on the first housing 410. The assembly switch 411 movably drives a mounting pin 413 so that the mounting pin 413 moves, for example, slides, between a locked position and an unlocked position. Accordingly, a receiving groove 432 is provided at the corresponding position on the second housing 430 to at least partially receive the mounting pin 413. In another aspect, a mounting bracket 415 is also provided at the bottom of the first housing 410, and the mounting bracket 415 can abut on a socket 434 at the corresponding position on the second housing 430. Hence, the first housing 410 is locked to the second housing 430 through the fitting between the mounting bracket 415 and the socket 434 and the fitting between the mounting pin 413 and the receiving groove 432. In order to make the fitting between the first housing 410 and the second housing 430 more stable, in some embodiments, the fitting between a mounting bracket and a socket may be provided at more than one position. For example, still with reference to FIG. 4C, in some embodiments, the first housing 410 is further provided with a second mounting bracket 417, and the second housing 430 is provided with a second socket 436. The second socket 436 and the second mounting bracket 417 are arranged to fit or correspond to each other, so that the second socket 436 can receive or support at least part of the second mounting bracket 417. Hence, the first housing 410 and the second housing 430 can be further fixed.

The connection between the first housing and the second housing may be implemented in other suitable methods depending on actual needs. For example, in some embodiments, the mounting pin and the assembly switch or the mounting bracket may be provided on the second housing, and the corresponding receiving groove or socket may be provided on the first housing. In some embodiments, the second socket may be provided on the first housing, and the second mounting bracket may be provided on the second housing. Other variations are also possible.

In some embodiments, the above assembly switch is also linked with a safety switch, so that once the assembly switch is actuated to move the mounting pin to the unlocked position or to move to the unlocked position, the power supply to the power device is cut off. In some embodiments, a braking operation is also performed before the power supply to the power device is cut off, so that the fan quickly stops running.

Figure 5:
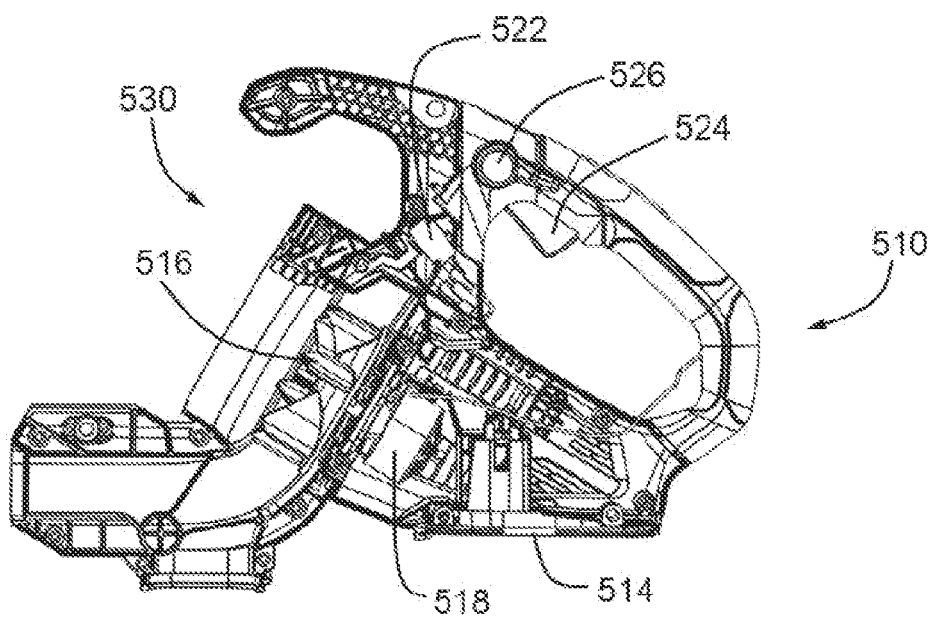
FIG. 5 is a schematic structural diagram of the blowing-sucking device according to yet some other embodiments of the present invention.

FIG. 5 is a schematic structural diagram of the blowing-sucking device according to some other embodiments of the present invention. The blowing-sucking device may be, for example, a specific implementation of the blowing-sucking devices illustrated with reference to one or more of FIGS. 1A to 1C, FIG. 3, and FIGS. 4A to 4D. The description with reference to one or more embodiments above and the description with reference to FIG. 5 may apply by analogy and may be combined in an appropriate form, if there is no contradiction.

More specifically, FIG. 5 is a schematic diagram of part of the first housing 510 and the second housing 530 of the blowing-sucking device. For clarity of illustration, some parts of the housings are removed to more clearly illustrate their internal structure. It can be seen from the figure that the part of the second housing 530 located near the fan 516 defines the upstream part and the downstream part of the flow paths. These parts, as well as the fan 516 itself, are the positions most likely to be blocked. In the present invention, blockage removal is made very easy by providing an independent second housing 530 and/or exposing the fan completely to the outside of the first housing. In addition, as shown in FIG. 5, since the electronic circuits of the blowing-sucking device are essentially located in the first housing 510, the part of the fan that needs to be cleaned can be exposed simply by removing the first housing 510, and there will be no substantial contact with the internal electronic circuits during the removal and cleaning process. Moreover, with this configuration, in the operation process, debris (usually carrying undesirable components, for example, moisture) will rarely enter the inside of the first housing 510 to contaminate or erode the mechanical components and/or electronics therein.

As also shown in the figure, the first housing 510 is provided with a power interface 514, a motor 518, and a fan 516. In addition, the first housing 510 is provided with a switching mechanism for controlling the operation of the blowing-sucking device and a triggering mechanism for triggering the switching mechanism. The switching mechanism comprises, for example, a switch 522. In some embodiments, the switching mechanism further comprises a speed regulating mechanism 526 (for example, a speed regulating circuit and/or a speed regulating button) for regulating the operation speed of the motor 518. The triggering mechanism comprises, for example, a trigger button 524. In some embodiments, the triggering mechanism comprises a membrane button to provide a better hand feel and a longer life, thereby increasing operability and improving user experience.

Those skilled in the art should understand that the embodiments herein are only for the purpose of exemplifying the present invention, and are by no means limiting the present invention.

In addition, one drawing may show multiple elements. Those skilled in the art should understand that this is only for the purpose of simplicity and does not mean that each element is necessary. Those skilled in the art will understand that one or more elements in the same drawing may be optional or additional elements.

Those skilled in the art should also understand that the above embodiments attempt to illustrate one or more ideas of the present invention from different aspects, and they are not isolated; instead, those skilled in the art may combine different embodiments in an appropriate way based on the above examples to obtain other examples of the technical solution.

Unless otherwise defined, the technical and scientific terms used herein have the same meanings as commonly understood by those ordinarily skilled in the art of the present invention. The implementations of the present invention are illustrated in non-limiting embodiments. Various variations that can be conceived by those skilled in the art on the basis of the embodiments disclosed above shall fall within the scope of the present invention.

The invention claimed is:

1. Blowing-sucking device, wherein the blowing-sucking device comprises a fan and defines a blowing path and a sucking path, and comprises a first housing, a second housing, and at least one air duct, wherein the second housing is provided between the first housing and the at least one air duct, and defines at least part of the blowing path and/or the sucking path, and the second housing is configured to be detachably connected to both the first housing and the at least one air duct, wherein the at least one air duct comprises a suction pipe and a blowing pipe, and the second housing comprises a first air port, a second air port, and a third air port, wherein the suction pipe is connected to the second housing through the first air port, the blowing pipe is connected to the second housing through the second air port, and the third air port is configured to be operatively connected to a collecting device, and wherein the blowing-sucking device is configured as such that, in a first mode, airflow enters the suction pipe and enters the collecting device through the first air port and the third air port, and, in a second mode, airflow enters the suction pipe and leaves the blowing pipe through the first air port and the second air port.

2. Blowing-sucking device according to claim 1, wherein the first housing defines a first axis, the second housing defines a second axis, and the at least one air duct defines a third axis, wherein the first axis and the second axis are parallel or form an acute angle.

3. Blowing-sucking device according to claim 1, wherein the second housing is further provided with a mounting mechanism, which comprises a fixing part for fixing the collecting device.

4. Blowing-sucking device according to claim 3, wherein the blowing-sucking device further comprises a travelling mechanism configured to at least partially support the at least one air duct.

5. Blowing-sucking device according to claim 1, wherein the blowing pipe is provided below the suction pipe.

6. Blowing-sucking device according to claim 1, wherein the first housing is provided with a first holding mechanism, the second housing is provided with a second holding mechanism.

7. Blowing-sucking device according to claim 1, wherein the first housing is provided with a switching mechanism for controlling the blowing-sucking device and a triggering mechanism for triggering the switching mechanism.

8. Blowing-sucking device, wherein the blowing-sucking device comprises a first housing and at least one air duct, a power device is provided in the first housing, and a fan is connected to the power device, wherein the fan is at least partially located outside the first housing, and the first housing is configured to be detachably mounted on the blowing-sucking device to selectively expose the fan, wherein the blowing-sucking device further comprises a second housing provided between the first housing and the at least one air duct, the first housing is configured to be detachably mounted on the second housing, and the fan is locate in the second housing, wherein the at least one air duct comprises a suction pipe and a third air pipe, and the second housing comprises a first air port, a second air port, and a third air port, wherein the suction pipe is connected to the second housing through the first air port, the blowing pipe is connected to the second housing through the second air port, and the third air port is configured to be operatively connected to a collecting device, and where the blowing-sucking device is configured as such that, in a first mode, airflow enters the suction pipe and enters the collecting device through the first air port and the third air port, and, in a second mode, airflow enters the suction pipe and leaves the blowing pipe through the first air port and the second air port.

9. Blowing-sucking device according to claim 8, wherein the second housing is configured to be detachably connected to both the first housing and the at least one air duct.

10. Blowing-sucking device according to claim 8, wherein the first housing defines a first axis, the second housing defines a second axis, and the at least one air duct defines a third axis.

11. Blowing-sucking device according to claim 8, wherein the second housing is further provided with a mounting mechanism, which comprises a fixing part for fixing the collecting device.

12. Blowing-sucking device according to claim 8, wherein the blowing-sucking device further comprises a travelling mechanism configured to at least partially support the at least one air duct.

13. Blowing-sucking device according to claim 8, wherein the blowing pipe is provided below the suction pipe.

14. Blowing-sucking device according to claim 8, wherein the first housing is provided with a first holding mechanism, the second housing is provided with a second holding mechanism.

15. Blowing-sucking device according to claim 8, wherein the first housing is provided with a switching mechanism for controlling the blowing-sucking device and a triggering mechanism for triggering the switching mechanism.

16. Blowing-sucking device, wherein the blowing-sucking device comprises a fan and defines a blowing path and a sucking path, and comprises a first housing, a second housing, and at least one air duct, wherein the second housing is provided between the first housing and the at least one air duct, and defines at least part of the blowing path and/or the sucking path, and the second housing is configured to be detachably connected to both the first housing and the at least one air duct, wherein the blowing pipe is provided below the suction pipe.

17. Blowing-sucking device according to claim 16, wherein the first housing defines a first axis, the second housing defines a second axis, and the at least one air duct defines a third axis, wherein the first axis and the second axis are parallel or form an acute angle.

18. Blowing-sucking device according to claim 16, wherein the second housing is further provided with a mounting mechanism, which comprises a fixing part for fixing the collecting device.

19. Blowing-sucking device according to claim 16, wherein the first housing is provided with a first holding mechanism, the second housing is provided with a second holding mechanism.

20. Blowing-sucking device according to claim 16, wherein the first housing is provided with a switching mechanism for controlling the blowing-sucking device and a triggering mechanism for triggering the switching mechanism.

* * * * *